US012661936B2

(12) United States Patent
Hatanaka et al.

(10) Patent No.: US 12,661,936 B2
(45) Date of Patent: Jun. 23, 2026

(54) PNEUMATIC TIRE

(71) Applicant: BRIDGESTONE CORPORATION, Tokyo (JP)

(72) Inventors: Shintaro Hatanaka, Tokyo (JP); Isao Kuwayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/257,585

(22) PCT Filed: Nov. 5, 2021

(86) PCT No.: PCT/JP2021/040880
§ 371 (c)(1),
(2) Date: Jun. 15, 2023

(87) PCT Pub. No.: WO2022/158086
PCT Pub. Date: Jul. 28, 2022

(65) Prior Publication Data
US 2024/0034102 A1 Feb. 1, 2024

(30) Foreign Application Priority Data
Jan. 22, 2021 (JP) ................................. 2021-009053

(51) Int. Cl.
B60C 15/06 (2006.01)
B60C 13/00 (2006.01)

(52) U.S. Cl.
CPC .... B60C 15/0603 (2013.01); B60C 2013/007 (2013.01); B60C 2015/061 (2013.01); B60C 2015/0614 (2013.01); Y10T 152/10828 (2015.01); Y10T 152/10837 (2015.01); Y10T 152/10846 (2015.01)

(58) Field of Classification Search
None
See application file for complete search history.

(56) References Cited

U.S. PATENT DOCUMENTS 10,759,233 B2    9/2020   Matsumoto et al.
2014/0373995 A1 * 12/2014   Handlos
(Continued)

FOREIGN PATENT DOCUMENTS

CN          102712219 A      10/2012
CN          105026180 A      11/2015
(Continued)

OTHER PUBLICATIONS

English machine translation of JP 2017-121899 A, Jul. 13, 2017.*
(Continued)

*Primary Examiner* — Adrienne C. Johnstone
(74) *Attorney, Agent, or Firm* — KENJA IP LAW PC

(57) ABSTRACT

Provided is a pneumatic tire including: a pair of bead cores embedded in a pair of bead portions; and a carcass including one or more carcass plies extending in a toroidal form between the pair of bead cores, wherein bead fillers are disposed on an outer side in a tire radial direction of the bead cores, rubber chafers are provided on an outer side in a tire width direction of the bead fillers, and when a storage modulus of the bead fillers is E1', and a storage modulus of the rubber chafers is E2', the ratio E2'/E1' satisfies $0.4 \le E2'/E1' \le 1$.

8 Claims, 2 Drawing Sheets

(56) References Cited

U.S. PATENT DOCUMENTS

| | | | |
|---|---|---|---|
| 2015/0298509 | A1 | 10/2015 | Shimamura |
| 2015/0367684 | A1 | 12/2015 | Tomida |
| 2015/0375573 | A1 | 12/2015 | Nakazato et al. |
| 2017/0274710 | A1* | 9/2017 | Matsumoto ......... B60C 15/0603 |
| 2019/0329594 | A1* | 10/2019 | Takenaka |
| 2020/0412924 | A1 | 12/2020 | Takahashi |
| 2021/0031570 | A1 | 2/2021 | Kagaya |
| 2023/0078031 | A1 | 3/2023 | Naruse |

FOREIGN PATENT DOCUMENTS

| | | | |
|---|---|---|---|
| CN | 115052759 | A | 9/2022 |
| EP | 0554108 | A1 * | 8/1993 |
| EP | 3636454 | A1 * | 4/2020 |
| EP | 3636454 | B1 | 11/2020 |
| JP | 2007045361 | A | 2/2007 |
| JP | 2011037339 | A | 2/2011 |
| JP | 2017121899 | A | 7/2017 |
| JP | 2017121908 | A | 7/2017 |
| JP | 2018083475 | A | 5/2018 |
| JP | 2019137327 | A | 8/2019 |
| JP | 2020055468 | A | 4/2020 |
| JP | 2020185843 | A | 11/2020 |
| JP | 2021009053 | A | 1/2021 |
| WO | 2013137340 | A1 | 9/2013 |
| WO | 2014133173 | A1 | 9/2014 |
| WO | 2016035840 | A1 | 3/2016 |
| WO | 2021166792 | A1 | 8/2021 |

OTHER PUBLICATIONS

The Pneumatic Tire, Alan Neville Gent and Joseph D. Walter, US Department of Transportation, Feb. 2006, p. 40.*

Jan. 11, 2022, International Search Report issued in the International Patent Application No. PCT/JP2021/040880.

Jul. 20, 2023, International Preliminary Report on Patentability issued in the International Patent Application No. PCT/JP2021/040880.

Jun. 25, 2024, search result of the Extended European Search Report issued by the European Patent Office in the corresponding European Patent Application No. 21921189.3.

Apr. 25, 2025, search result of Office Action issued by the China National Intellectual Property Administration in the corresponding Chinese Patent Application No. 202180085174.0.

Jul. 30, 2025, search result of Office Action issued by the China National Intellectual Property Administration in the corresponding Chinese Patent Application No. 202180085174.0.

Nov. 27, 2025, search result of Office Action issued by the China National Intellectual Property Administration in the corresponding Chinese Patent Application No. 202180085174.0.

* cited by examiner

PNEUMATIC TIRE

TECHNICAL FIELD

The present disclosure relates to a pneumatic tire.

BACKGROUND

In general, it is desirable to increase the cornering power of pneumatic tires.

Especially in recent years, fuel efficiency can be improved by simplifying tire structures and reducing their weights, such as by thinning rubber in the sidewall portions or reducing the height of the bead fillers (for example, Patent Literature 1 [PTL 1]). In such cases, there is a concern about a decrease in cornering power, due to a decrease in lateral spring coefficient in particular.

CITATION LIST

Patent Literature

PTL 1: JP 2019-137327 A

SUMMARY

Technical Problem

It would be helpful to provide a pneumatic tire that can prevent a decrease in cornering power.

Solution to Problem

The gist of the present disclosure is as follows.

(1) A pneumatic tire including:

a pair of bead cores embedded in a pair of bead portions; and a carcass including one or more carcass plies extending in a toroidal form between the pair of bead cores, wherein bead fillers are disposed on an outer side in a tire radial direction of the bead cores, rubber chafers are provided on an outer side in a tire width direction of the bead fillers, and when a storage modulus of the bead fillers is E1', and a storage modulus of the rubber chafers is E2', the ratio E2'/E1' satisfies 0.4≤E2'/E1'≤1.

Herein, a "storage modulus" refers to a value measured at a temperature of 25° C. in accordance with JIS K7244.

Furthermore, a "rim separation point", which will be described below, refers to a point at which an outer surface of the tire separates from the rim flange when the pneumatic tire is in a reference state in which it is mounted on the applicable rim, a specified internal pressure is applied, and no load is applied.

Herein, an "applicable rim" refers to a standard rim (which is called a measuring rim in STANDARDS MANUAL of the European Tyre and Rim Technical Organisation [ETRTO], and a design rim in YEAR BOOK of the Tire and Rim Association. Inc. [TRA]) of an applicable size that is described or will be described in industrial standards valid for a region in which the tire is produced or used. Examples of the industrial standards include JATMA Year Book of the Japan Automobile Tyre Manufacturers Association (JATMA) in Japan, STANDARDS MANUAL of the ETRTO in Europe, and YEAR BOOK of the TRA in the United States of America (that is, the "rim" includes any size currently included and any size which will be possibly included in the industrial standards. Examples of the "size which will be described" include those described as "FUTURE DEVELOPMENTS" in the ETRTO 2013 edition). As for sizes not described in the industrial standards, a "rim" refers to a rim having a width corresponding to the bead width of the tire.

Moreover, a "specified internal pressure" refers to an air pressure (maximum air pressure) corresponding to the maximum load capability of a single wheel of an applicable size/ply rating specified by the JATMA or the like. As for sizes not described in the industrial standards, a "specified internal pressure" refers to an air pressure (maximum air pressure) corresponding to the maximum load capability determined depending on a vehicle to which the tire is mounted.

Advantageous Effect

According to the present disclosure, a pneumatic tire that can prevent a decrease in cornering power can be provided.

DETAILED DESCRIPTION

In the following, embodiments of the present disclosure will be described in detail by illustration with reference to the drawings.

Figure 1:
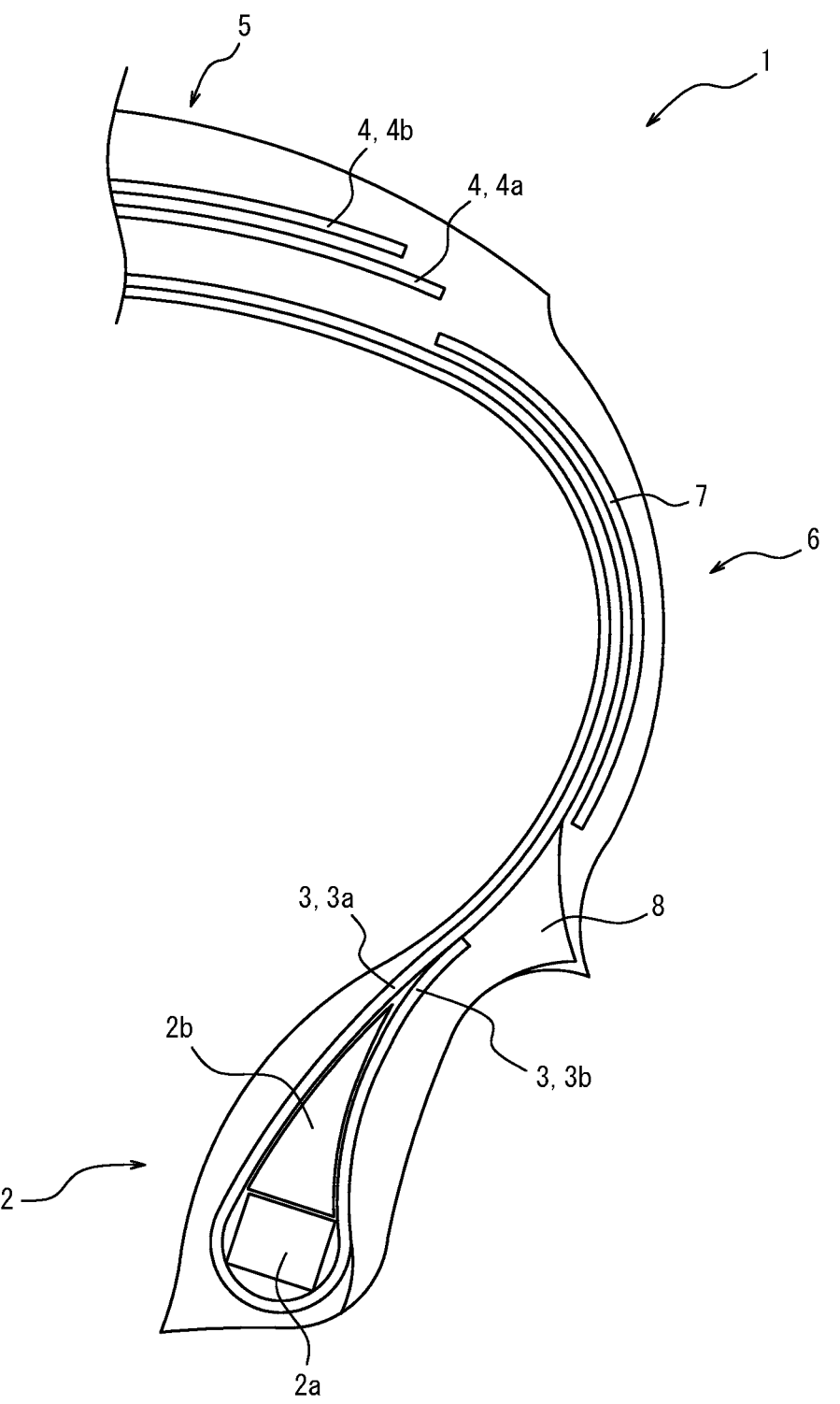
FIG. 1 is a partial cross-sectional view taken along a tire width direction of a pneumatic tire according to an embodiment of the present disclosure.

FIG. 1 is a partial cross-sectional view taken along a tire width direction of a pneumatic tire (hereinafter referred to simply as a tire) according to an embodiment of the present disclosure. FIG. 1 illustrates a cross-section in the tire width direction in the aforementioned reference state.

The tire 1 includes a pair of bead cores 2a embedded in a pair of bead portions 2, and a carcass 3 including one or more carcass plies extending in a toroidal form between the pair of bead cores 2a.

In the bead portions 2, bead fillers 2b are disposed on an outer side in a tire radial direction of the bead cores 2a. The bead cores 2a in this example include a plurality of bead wires that are surrounded by a rubber coating. The bead wires in this example are formed by steel cords. In this example, the bead fillers 2b are made of rubber or the like and have a substantially triangular cross-sectional shape with a thickness decreasing toward the outer side in the tire radial direction.

Here, the height of the bead fillers 2b (measured in the tire radial direction) is preferably 8 to 25 mm, as in this example. This is because setting the height of the bead fillers 2b to 8 mm or more can prevent air entry during manufacturing, while setting the height of the bead fillers 2b to 25 mm or less can reduce the weight of the tire. For the same reason, it is more preferable to set the height of the bead fillers 2b to 10 to 15 mm.

The carcass 3 in this example includes a carcass body portion 3a that extends in a toroidal form between the pair of bead portions 2, and carcass fold-up portions 3b that are folded from the carcass body portion 3a around the bead cores 2a from the inner side in the tire width direction to the outer side in the tire width direction. Organic fibers, such as PET, hybrid cords made of two types of organic fiber cords (e.g., nylon and aramid) twisted together, or the like may be used as carcass cords. As mentioned above, the carcass plies are plies of radially arranged cords.

In this example, outer ends in the tire radial direction of the carcass fold-up portions 3b are located further inward in the tire radial direction than the tire maximum width position and are located further outward in the tire radial direction than outer ends in the tire radial direction of the bead fillers 2b. With this configuration, the weight of the tire can be further reduced.

As illustrated in FIG. 1, on the outer side in the tire radial direction of a crown portion of the carcass 3, there is a belt 4, which includes one or more (two in the illustrated example) belt layers 4a and 4b. Belt cords of the belt layers 4a and 4b intersect each other between the layers and extend at an inclination angle of 30° to 60° in this example with respect to a tire circumferential direction. Steel cords can be used for the belt cords, but organic fiber cords can also be used to reduce weight. A tread portion 5 made of tread rubber is disposed on the outer side in the tire radial direction of the belt 4.

As illustrated in FIG. 1, a pair of sidewall portions 6 are connected between the pair of bead portions 2 and the tread portion 5. Here, the rubber gauge (thickness of rubber measured in a direction perpendicular to outer surfaces of the sidewall portions 6 in the cross-section in the tire width direction in the aforementioned reference state) at the tire maximum width position is preferably 1 mm or more but 3 mm or less, as in this example. Setting the rubber gauge at the tire maximum width position to 1 mm or more can ensure minimum side-cut resistance, while setting the rubber gauge at the maximum width position of the tire to 3 mm or less can reduce the weight of the tire.

Here, as illustrated in FIG. 1, the tire 1 according to the present embodiment is provided with a reinforcing member 7, which extends at an angle with respect to the tire radial direction in an area including the tire maximum width position that stretches in the tire radial direction on the outer side in the tire width direction of the carcass 3. Additionally, in the illustrated example, the reinforcing member 7 has an arc shape along the carcass body portion 3a in the cross-section, but it may have other shapes, such as a straight line. Here, the "tire maximum width position" refers to a position where the width in the tire width direction of the pneumatic tire becomes maximum in the cross-section in the tire width direction in the aforementioned reference state.

In this example, the reinforcing member 7 includes organic fiber cords. Examples the organic fiber cords include organic fibers, such as PET, or hybrid cords made of two types of organic fiber cords (e.g., a nylon cord and an aramid cord) twisted together. The Young's modulus of the cords of the reinforcing member 7 (tested by JIS L1017 8.5 a] [2002] and determined in accordance with JIS L1017 8.8 [2002]) is not particularly limited, but can be 3000 to 5000 GPa, the number of cords of the reinforcing member 7 can be 20 to 70 cords/50 mm, and the cord diameter of the cords of the reinforcing member 7 can be 0.3 to 0.9 mm. Although it is preferable to dispose one layer of reinforcing member from the viewpoint of weight reduction, two or more layers can be disposed, and in such cases, it is preferable to adjust the Young's modulus, the number, and the diameter of the cords so that they can be reduced to be substantially equal to those of one layer in terms of stiffness and weight reduction.

As in this example, the reinforcing member 7 preferably extends at an angle of 30° to 60° with respect to the tire radial direction, and more preferably, it extends at an angle of 40° to 50° with respect to the tire radial direction.

The length in the tire radial direction of the reinforcing member 7 is preferably 10 to 40% of the height of the cross-section of the tire. Setting the length to 10% or more can improve cornering power, while setting the length to 40% or less can reduce weight increase.

Here, as illustrated in FIG. 1, the tire 1 according to the present embodiment is provided with rubber chafers 8 on the outer side in the tire width direction of the bead fillers 2b. The length in the tire radial direction of the rubber chafers 8 is preferably 30 to 60 mm.

Outer ends in the tire radial direction of the rubber chafers 8 are preferably located further outward in the tire radial direction than the rim separation point. Inner ends in the tire radial direction of the rubber chafers 8 are preferably located further inward in the tire radial direction than inner ends in the tire radial direction of the bead cores 2a. As illustrated in FIG. 1, in this example, the rubber chafers 8 extend further outward in the tire radial direction than the apex of a rim guard from the vicinity of a bead base line (imaginary line passing through bead bases and extending parallel to the tire width direction) in an area stretching in the tire radial direction. As illustrated in FIG. 1, in the region radially outward of the innermost point of the respective bead filler 2b, each of the rubber chafers 8 is in direct contact with the entire outer side in the tire width direction of the respective carcass fold-up portion 3b.

In the present embodiment, the rubber chafers 7 are made of highly elastic rubber, and specifically, when the storage modulus of the bead fillers 2b is E1' and the storage modulus of the rubber chafers 7 is E2', the ratio E2'/E1' satisfies $0.4 \leq E2'/E1' \leq 1$.

Advantageous effects of the pneumatic tire according to the present embodiment will be described below.

In the pneumatic tire according to the present embodiment, first of all, the height of the bead fillers 2b is 25 mm or less (in this example, furthermore, the outer ends in the tire radial direction of the carcass fold-up portions 3b are located further inward in the tire radial direction than the tire maximum width position, and the rubber gauge at the tire maximum width position is 3 mm or less, and the material of the carcass cords is an organic fiber, such as PET, or a hybrid cord made of two types of organic fibers). Accordingly, the weight of the tire can be reduced. As mentioned above, such a tire may suffer a decrease in cornering power due to a decrease in lateral spring coefficient.

Figure 2:
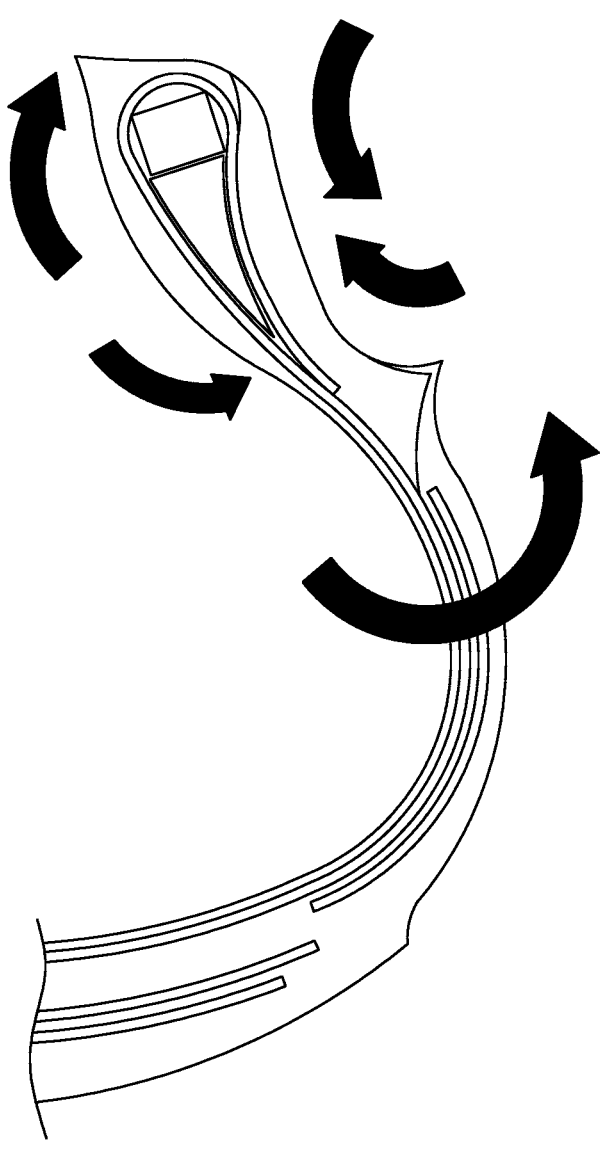
FIG. 2 schematically illustrates out-of-plane bending acting on a bead portion.

To address the above, the present inventors have conducted studies and found that an increased rotational component of lateral displacement, among translation, rotational, and bending components, is the cause of a decrease in lateral spring coefficient, when out-of-plane bending acts on a bead portion 2 as schematically illustrated in FIG. 2 (in particular, in a case in which the height of the bead fillers 2b is set to 25 mm or less as mentioned above, the stiffness of the bead portions decreases, and the degree of out-of-plane bending increases). Furthermore, as schematically illustrated in FIG. 2, it has been found that the out-of-plane bending acts as a tensile force on the side of the bead portion 2 that is closer to a tire inner surface, while also acting as a compressive force on the side of the bead portion that is close to the tire outer surface, and that a decrease in lateral spring coefficient can be prevented, in particular by withstanding the compressive force on the side of the bead portion 2 that is closer to the tire outer surface (inner side of the bending). This is the reason why the highly rigid ($0.4 \leq E2'/E1' \leq 1$) rubber chafers 8 are disposed on the outer side in the tire width direction of the bead fillers 2b as described above. As a result, even when a compressive force acts on the side the bead portions 2 that is closer to the tire outer surface, the highly rigid rubber chafers 8 can prevent an increase in the rotational component of the lateral displacement, thus preventing a decrease in lateral spring coefficient, thereby preventing a decrease in cornering power.

When the ratio E2'/E1' is less than 0.4, the effect of preventing an increase in the rotational component of the lateral displacement cannot be fully achieved. On the other hand, when the ratio E2'/E1' is greater than 1, friction coefficient at the contact area with the rim decreases, causing a concern that the tire may come off the rim.

As described above, the pneumatic tire according to the present embodiment can prevent a decrease in cornering power, while reducing the weight of the tire.

Although it is particularly effective in the aforementioned lightweight configuration as in the present embodiment, even in a case in which the aforementioned lightweight configuration is not adopted, the effect of preventing a decrease in cornering power can be obtained, because the highly rigid rubber chafers 8 can prevent an increase in the rotational component of lateral displacement due to a compressive force acting on the side of the bead portions 2 that is closer to the tire outer surface.

Here, for the same reason as above, the ratio E2'/E1' preferably further satisfies 0.6≤E2'/E1'≤1.

The length in the tire radial direction of the rubber chafers is preferably 30 to 60 mm. Setting the length to 30 mm or more can more fully provide the effect of preventing an increase in the rotational component of lateral displacement, while setting the length to 60 mm or less can minimize weight increase due to the disposition of the rubber chafers.

The outer ends in the tire radial direction of the rubber chafers are preferably located further outward in the tire radial direction than the rim separation point. That way, a wider area on which out-of-plane bending acts is covered, and the effect of preventing an increase in the rotational component of lateral displacement can be more fully obtained.

The inner ends in the tire radial direction of the rubber chafers are preferably located further inward in the tire radial direction than the inner ends in the tire radial direction of the bead cores. That way, a wider area on which out-of-plane bending acts is covered, and the effect of preventing an increase in the rotational component of lateral displacement can be more fully obtained.

The tire according to the present disclosure is preferably a pneumatic radial tire for passenger vehicles.

In an example, the tire has a shape with a narrow width and a large diameter, with a tire cross-sectional width SW of less than 165 (mm) and with a ratio SW/OD of the tire cross-sectional width SW to the outer diameter OD of 0.26 or less. Setting the tire cross-sectional width SW to be narrower than the tire outer diameter OD can reduce air resistance, and increasing the tire outer diameter OD relative to the tire cross-sectional width SW can prevent deformation of the tread rubber in the vicinity of a ground-contacting surface of the tire, thereby reducing rolling resistance. This can improve the fuel efficiency of the tire. The ratio SW/OD is preferably 0.25 or less, and more preferably 0.24 or less.

The above ratio is preferably satisfied when the internal pressure of the tire is 200 kPa or more, more preferably when it is 220 kPa or more, and even more preferably when it is 280 kPa or more. This is because rolling resistance can be reduced. On the other hand, the above ratio is preferably satisfied when the internal pressure of the tire is 350 kPa or less. This is because ride comfort can be improved.

From the viewpoint of maintaining the ground contact area, the tire cross-sectional width SW is preferably 105 mm or more, more preferably 125 mm or more, even more preferably 135 mm or more, and particularly preferably 145 mm or more, within the range in which the above ratio is satisfied. On the other hand, from the viewpoint of reducing air resistance, the tire cross-sectional width SW is preferably 155 mm or less, within the range in which the above ratio is satisfied. From the viewpoint of reducing rolling resistance, the tire outer diameter OD is preferably 500 mm or more, more preferably 550 mm or more, and even more preferably 580 mm or more, within the range in which the above ratio is satisfied. On the other hand, from the viewpoint of reducing air resistance, the tire outer diameter OD is preferably 800 mm or less, more preferably 720 mm or less, even more preferably 650 mm or less, and particularly preferably 630 mm or less, within the range in which the above ratio is satisfied. From the viewpoint of reducing rolling resistance, the rim diameter is preferably 16 inches or more, more preferably 17 inches or more, and even more preferably 18 inches or more, providing that the tire cross-sectional width SW and the outer diameter OD satisfy the above ratio. On the other hand, from the viewpoint of reducing air resistance, the rim diameter is preferably 22 inches or less, more preferably 21 inches or less, even more preferably 20 inches or less, and particularly preferably 19 inches or less, providing that the tire cross-sectional width SW and the outer diameter OD satisfy the above ratio. The aspect ratio of the tire is preferably 45 to 70, and more preferably 45 to 65, providing that the tire cross-sectional width SW and the outer diameter OD satisfy the above ratio.

In an example, the specific size of the tire may be, but is not particularly limited to, 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R18, 155/70R17, or 155/70R19.

In another example, the tire has a shape with a narrow width and a large diameter, with a tire cross-sectional width SW of 165 (mm) or more, wherein the tire cross-sectional width SW (mm) and the outer diameter OD (mm) satisfy the relational expression OD (mm)≥2.135×SW (mm)+282.3.

By satisfying the above relational expression, air resistance can be reduced, and rolling resistance can be reduced, whereby the fuel efficiency of the tire can be improved.

In a second embodiment, the ratio SW/OD is preferably 0.26 or less, more preferably 0.25 or less, and even more preferably 0.24 or less, providing that the tire cross-sectional width SW and the outer diameter OD satisfy the above expressional expression. This is because the fuel efficiency of the tire can be further improved.

The above relational expression and/or the ratio are/is preferably satisfied when the internal pressure of the tire is 200 kPa or more, more preferably when it is 220 kPa or more, and even more preferably when it is 280 kPa or more. This is because rolling resistance can be reduced. On the other hand, the above relational expression and/or the ratio are/is satisfied when the internal pressure of the tire is 350 kPa or less. This is because ride comfort can be improved.

Here, from the viewpoint of maintaining the ground contact area, the tire cross-sectional width SW is preferably 175 mm or more, and more preferably 185 mm or more, within the range in which the above relational expression is satisfied. On the other hand, from the viewpoint of reducing air resistance, the tire cross-sectional width SW is preferably 230 mm or less, more preferably 215 mm or less, even more preferably 205 mm or less, and particularly preferably 195 mm or less, within the range in which the above relational expression is satisfied. From the viewpoint of reducing rolling resistance, the tire outer diameter OD is preferably 630 mm or more, and more preferably 650 mm or more, within the range in which the above relational expression is satisfied. On the other hand, from the viewpoint of reducing air resistance, the tire outer diameter OD is preferably 800 mm or less, more preferably 750 mm or less, and even more preferably 720 mm or less, within the range in which the above relational expression is satisfied. Furthermore, from the viewpoint of reducing rolling resistance, the rim diameter is preferably 18 inches or more, and more preferably 19 inches or more, providing that the tire cross-sectional width SW and the outer diameter OD satisfy the above relational expression. On the other hand, from the viewpoint of reducing air resistance, the rim diameter is preferably 22 inches or less, and more preferably 21 inches or less, providing that the tire cross-sectional width SW and the outer diameter OD satisfy the above relational expression. Moreover, the aspect ratio of the tire is preferably 45 to 70, and more preferably 45 to 65, providing that the tire cross-sectional width SW and the outer diameter OD satisfy the above relational expression.

In an example, the specific size of the tire may be, but is not particularly limited to, 165/45R22, 165/55R18, 165/55R19, 165/55R20, 165/55R21, 165/60R19, 165/65R19, 165/70R18, 175/45R23, 175/55R19, 175/55R20, 175/55R22, 175/60R18, 185/45R22, 185/50R20, 185/55R19, 185/55R20, 185/60R19, 185/60R20, 195/50R20, 195/55R20, 195/60R19, 205/50R21, 205/55R20, or 215/50R21.

In yet another example, the tire has a shape with a narrow width and a large diameter, wherein the tire cross-sectional width SW (mm) and the outer diameter OD (mm) satisfy the relational expression $$OD\ (mm) \geq -0.0187 \times SW\ (mm)\ 2 + 9.15 \times SW\ (mm) - 380.$$

By satisfying the above relational expression, air resistance can be reduced, and rolling resistance can be reduced, whereby the fuel efficiency of the tire can be improved.

In a third embodiment, the ratio SW/OD is preferably 0.26 or less, more preferably 0.25 or less, and even more preferably 0.24 or less, providing that the tire cross-sectional width SW and the outer diameter OD satisfy the above expressional expression. This is because the fuel efficiency of the tire can be further improved.

The above relational expression and/or the ratio are/is preferably satisfied when the internal pressure of the tire is 200 kPa or more, more preferably when it is 220 kPa or more, and even more preferably when it is 280 kPa or more. This is because rolling resistance can be reduced. On the other hand, the above relational expression and/or the ratio are/is preferably satisfied when the internal pressure of the tire is 350 kPa or less. This is because ride comfort can be improved.

Here, from the viewpoint of maintaining the ground contact area, the tire cross-sectional width SW is preferably 105 mm or more, more preferably 125 mm or more, even more preferably 135 mm or more, and particularly preferably 145 mm or more, within the range in which the above relational expression is satisfied. On the other hand, from the viewpoint of reducing air resistance, the tire cross-sectional width SW is preferably 230 mm or less, more preferably 215 mm or less, even more preferably 205 mm or less, and particularly preferably 195 mm or less, within the range in which the above relational expression is satisfied. From the viewpoint of reducing rolling resistance, the tire outer diameter OD is preferably 500 mm or more, more preferably 550 mm or more, and even more preferably 580 mm or more, within the range in which the above relational expression is satisfied. On the other hand, from the viewpoint of reducing air resistance, the tire outer diameter OD is preferably 800 mm or less, more preferably 750 mm or less, and even more preferably 720 mm or less, within the range in which the above relational expression is satisfied. Furthermore, from the viewpoint of reducing rolling resistance, the rim diameter is preferably 16 inches or more, more preferably 17 inches or more, and even more preferably 18 inches or more, providing that the tire cross-sectional width SW and the outer diameter OD satisfy the above relational expression. On the other hand, from the viewpoint of reducing air resistance, the rim diameter is preferably 22 inches or less, more preferably 21 inches or less, and even more preferably 20 inches or less, providing that the tire cross-sectional width SW and the outer diameter OD satisfy the above relational expression. Moreover, the aspect ratio of the tire is preferably 45 to 70, and more preferably 45 to 65, providing that the tire cross-sectional width SW and the outer diameter OD satisfy the above relational expression.

In an example, the specific size of the tire may be, but is not particularly limited to, 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R18, 155/70R17, 155/70R19, 165/45R22, 165/55R18, 165/55R19, 165/55R20, 165/55R21, 165/60R19, 165/6R19, 165/70R18, 175/45R23, 175/55R18, 175/55R19, 175/55R20, 175/55R22, 175/60R18, 185/45R22, 185/50R20, 185/55R19, 185/55R20, 185/60R19, 185/60R20, 195/50R20, 195/55R20, 195/60R19, 205/50R21, 205/55R20, or 215/50R21.

Here, as mentioned above, a tire with the aforementioned lightweight configuration may suffer a decrease in cornering power due to a decrease in lateral spring coefficient. The present inventors have conducted studies and found that the cause of a decrease in lateral spring coefficient is that lateral displacement is concentrated directly under the load and the surrounding area is pulled in the direction of the load, causing an increase in shear deformation on the circumference. For this reason, the tire according to the present embodiment is provided with the reinforcing member 7, which extends at an angle with respect to the tire radial direction in an area including the tire maximum width position that stretches in the tire radial direction on the outer side in the tire width direction of the carcass 3. As a result, two forces pulling in opposite direction act on the reinforcing member 7 during shear deformation, thereby reducing the shear deformation. This can prevent a decrease in lateral spring coefficient and further prevents a decrease in cornering power. Although it is particularly effective in the aforementioned lightweight configuration as in the present embodiment, even in a case in which the aforementioned lightweight configuration is not adopted, the effect of further preventing a decrease in cornering power can be obtained, because two forces pulling in the opposite directions act on the reinforcing member 7 during shearing deformation.

Here, the reinforcing member preferably includes organic fiber cords. Since organic fibers are lightweight despite their rigidity, weight increase due to the addition of the reinforcing member can be minimized.

The reinforcing member preferably extends at an angle of 30° to 60° with respect to the tire radial direction, and more preferably, it extends at an angle of 40° to 50° with respect to the tire radial direction. The effect of preventing shear deformation illustrated schematically in FIG. 4 becomes most significant when the inclination angle of the reinforcing member with respect to the tire radial direction is close to approximately 45°, and therefore, setting the above range can further prevent a decrease in cornering power.

The length in the tire radial direction of the reinforcing member is preferably 10 to 40% of the height of the cross-section of the tire. Setting the length to 10% or more further ensures that the effect of preventing a decrease in cornering power can be obtained, while setting the length to 40% or less can minimize weight increase due to the addition of the reinforcing member. In an example, an outer end in the tire radial direction of the reinforcing member can be at a position corresponding to 50 to 80% of the height of the cross-section of the tire from the bead base line (imaginary line passing through bead bases and extending parallel to the tire width direction), and an inner end in the tire radial direction of the reinforcing member can be at a position corresponding 15 to 40% of the height of the cross-section of the tire from the bead base line. The length in the tire radial direction of the reinforcing member can be, but is not particularly limited to, 15 to 40 mm.

EXAMPLES

In order to verify advantageous effects of the present disclosure, Example tire, Comparative Example tire, and Conventional Example tire were experimentally produced, and their performance was evaluated. Each tire includes: a pair of bead cores embedded in a pair of bead portions; and a carcass including one or more carcass plies extending in a toroidal form between the pair of bead cores, wherein bead fillers are disposed on an outer side in a tire radial direction of the bead cores, and rubber chafers are provided on an outer side in a tire width direction of the bead fillers. The specifications of each tire are summarized in Table 1 below. In Table 1, "side portion" means "sidewall portion", and "side portion gauge" means a rubber gauge at a tire maximum width position. Furthermore, BF is an abbreviation for "bead filler", and GC for "rubber chafer." Lateral spring coefficients were measured, by mounting each tire on a rim, measuring the amount of deflection using an indoor tester, and measuring the lateral spring coefficient from a tangential gradient at a load of 4 kN. The weight of each tire before rim mounting was also measured. In Table 1, evaluation results are presented as an index with the Conventional Example being 100.

TABLE 1

| | | Conventional Example | Comparative Example | Example |
|---|---|---|---|---|
| Side portion gauge [mm] | | 2.6 | 1 | 1 |
| Reinforcing member | Position | Bead portion | N/A | Side portion |
| | Angle | 45° | N/A | 45° |
| GC/BF rubber hardness | E2'/E1' | 0.38 | 0.38 | 1 |

TABLE 1-continued

| | Conventional Example | Comparative Example | Example |
|---|---|---|---|
| GC height [mm] | 45 | 45 | 45 |
| BF height [mm] | 30 | 10 | 10 |
| Weight [%]*the smaller the better | 100 | 80 | 81 |
| Lateral spring [%]*the greater the better | 100 | 89 | 119 |

REFERENCE SIGNS LIST

1 Pneumatic tire
2 Bead portion
3 Carcass
7 Belt
5 Tread portion
6 Sidewall portion
7 Reinforcing member
8 Rubber chafer

The invention claimed is:

1. A pneumatic tire comprising:
a pair of bead cores embedded in a pair of bead portions; and
a carcass including one or more carcass plies extending in a toroidal form between the pair of bead cores, wherein
the carcass includes a carcass body portion extending in a toroidal form between the pair of bead portions, and carcass fold-up portions being folded from the carcass body portion around the bead cores from an inner side in a tire width direction to an outer side in the tire width direction,
elastomeric bead fillers are disposed one on an outer side in a tire radial direction of each of the bead cores,
rubber chafers are provided one on the outer side in the tire width direction of each of the bead fillers,
when a storage modulus of the bead fillers is E1', and a storage modulus of the rubber chafers is E2', the ratio E2'/E1' satisfies $0.6 \leq E2'/E1' \leq 1$,
a height of the bead fillers is 25 mm or less,
outer ends in the tire radial direction of the carcass fold-up portions are located further inward in the tire radial direction than a tire maximum width position,
the rubber gauge at the tire maximum width position is 3 mm or less, and
in the region radially outward of an innermost point of the respective bead filler, each of the rubber chafers is in direct contact with an entire outer side in the tire width direction of a respective one of the carcass fold-up portions.

2. The pneumatic tire according to claim 1, wherein a length in the tire radial direction of each of the rubber chafers is 30 to 60 mm.

3. The pneumatic tire according to claim 2, wherein innermost ends in the tire radial direction of the rubber chafers are located further inward in the tire radial direction than an innermost end in the tire radial direction of the respective one of the bead cores.

4. The pneumatic tire according to claim 2, wherein outermost ends in the tire radial direction of the rubber chafers are each located further outward in the tire radial direction than a respective rim separation point.

5. The pneumatic tire according to claim 4, wherein innermost ends in the tire radial direction of the rubber chafers are located further inward in the tire radial direction than an innermost end in the tire radial direction of the respective one of the bead cores.

6. The pneumatic tire according to claim 1, wherein outermost ends in the tire radial direction of the rubber chafers are each located further outward in the tire radial direction than a respective rim separation point.

7. The pneumatic tire according to claim 6, wherein innermost ends in the tire radial direction of the rubber chafers are located further inward in the tire radial direction than an innermost end in the tire radial direction of the respective one of the bead cores.

8. The pneumatic tire according to claim 1, wherein innermost ends in the tire radial direction of the rubber chafers are each located further inward in the tire radial direction than an innermost end in the tire radial direction of the respective one of the bead cores.

\* \* \* \* \*